Feb. 16, 1971 J. E. WARD ET AL 3,564,535

VECTOR GENERATION BY ANALOG INTEGRATION OF A TRAIN OF STANDARDIZED DIGITAL PULSES

Filed Feb. 15, 1967

3 Sheets-Sheet 1

INVENTORS
JOHN E. WARD
ROBERT H. STOTZ
URI F. GRONEMANN
THOMAS B. CHEEK
ATTORNEY

INVENTORS
JOHN E. WARD
ROBERT H. STOTZ
URI F. GRONEMANN
THOMAS B. CHEEK
ATTORNEY

INVENTORS
JOHN E. WARD
ROBERT H. STOTZ
URI F. GRONEMANN
THOMAS B. CHEEK
ATTORNEY:

United States Patent Office
3,564,535
Patented Feb. 16, 1971

3,564,535
VECTOR GENERATION BY ANALOG INTEGRATION OF A TRAIN OF STANDARDIZED DIGITAL PULSES

John E. Ward, Lexington, Robert H. Stotz, Bedford, Thomas B. Cheek, Watertown, and Uri F. Gronemann, Cambridge, Mass., assignors to Massachusetts Institute of Technology, Cambridge, Mass., a corporation of Massachusetts Filed Feb. 15, 1967, Ser. No. 616,239
Int. Cl. H03k 13/02
U.S. Cl. 340—347 7 Claims

ABSTRACT OF THE DISCLOSURE

An improved vector generator for display devices comprising a dual binary rate multiplier, pulse standardizers, current sources, gating, and analog integrators, which eliminates the need for up-down digital counters and digital-to-analog converters. The combination of pulse standardizer, current sources, gating, and analog integrator acts as an incremental one-bit digital-to-analog converter with accumulation.

BACKGROUND OF THE INVENTION

(1) Field of the invention

The invention relates to the method and apparatus for generating vectors and in particular to line generation for display devices.

(2) Description of the prior art

In previous devices, many of which are commercially available, vector generation has been done basically in one of two manners, digital or analog. Digital vector generators, such as that illustrated in FIG. 1, produce a string of pulses from Binary Rate Multipliers (BRM's) 10 for $\Delta X$ and $\Delta Y$ of a vector, which are accumulated in up-down digital counters 11. Each counter 11 connects to the digital input of a digital-to-analog converter (D/A) 12 which produces an analog voltage for positioning the Cathode Ray Tube (CRT) beam. Thus, the beam position is specified by the digital value of these counters 11. Each time either X or Y is incremented, the beam is intensified to produce a spot at the new position. The direction of count in the counters 11 is determined by sign control logic, which is not shown.

Two forms of analog vector generator are prevalent. FIG. 2 illustrates a typical constant-time form of vector generator. In this form the computer's digital representation of $\Delta X$ and $\Delta Y$ are converted to analog voltages by D/A converters 12, which are used as inputs to analog integrators 13. The output voltages of the integrators 13 are the X and Y deflection voltages for the CRT. The time constant of the integrator 13 is set so that after time T the beam will have moved to its correct new position $X'=X+\Delta X$, $Y'=Y+\Delta Y$. A disadvantage of this technique is that the sweep speed varies with the line length. Hence, to keep the lines at constant brightness, circuity is required to control the beam intensity as a function of line length. As in the digital vector generator, sign control logic which is not shown, is needed to determine the direction of sweep.

The second form of analog vector generator, illustrated in FIG. 3, sweeps the beam at constant speed, producing constant intensity. In this type, the computer specifies the X and Y integration rates ($\Delta X/\Delta t$, $\Delta Y/\Delta t$) and the integration time ($\Delta t$). In this technique an accurate timer must be a part of the system, and the computer must calculate $\Delta t$ for each line it draws.

In all the previous techniques described above, high-quality expensive D/A converters 12 are required in both the X and Y channels. In the present invention, the need for the standard D/A converter 12 is eliminated along with its associated up-down digital counter 11 by utilization of pulse standardizer circuity that performs the functions of the converter 12 and counter 11 at a fraction of the cost. The present invention has the added advantage over analog vector generators, which it shares with the digital vector generator technique, in that no calculation of $\Delta t$ or line length is required in order to maintain uniform intensity.

SUMMARY

A method and apparatus for generating vectors in which data is received serially in digital form via dataphone from a computer. The incoming signal is stored in a buffer register until it is full at which time its X and Y information is rapidly transferred to a dual binary rate multiplier (BRM's) which serves as a pulse generator. After the BRM's are filled sequentially, the 8-bit counter associated with its X and Y registers is allowed to count. The BRM's are controlled by the data in the X and Y registers. The output of each BRM is a pulse train containing as many pulses as the binary count in its associated register. Each pulse train is fed to a pulse standardizer circuit that puts out precise pulses of constant width. Each constant-width pulse is used to gate a unit of current from a current source into an analog integrator. The sign of the change in the analog output depends on which of two opposite-polarity current sources is selected. The output voltage of the integrator changes as each incoming pulse is integrated. These voltages are used to deflect the beam on the storage cathode ray tube (CRT). After each new voltage increment appears on one of the integrating capacitors, an intensify pulse is generated, causing a dot to appear on the CRT screen. Thus, a pulse train produces a series of closely spaced dots that define a straight line. The angle and length of this line depend on the relative magnitudes of the binary numbers in the X and Y registers of the BRM. Also, since the BRM by means of sign logic can produce either positive or negative pulse, lines may be drawn in any direction. After a line is complete, the electron beam remains at its last location until the next incoming signal is received. Thereupon, a new line is initiated, starting where the last one left off. By continuing in this fashion line drawings of any complexity can be made up.

Lines may be drawn as a series of points spaced about 0.008 inch apart when using a 5 inch CRT. Using a basic clock cycle of 100 kHz. points can be plotted at a rate of one every ten microseconds or 2.5 milliseconds for a complete line. The present invention draws lines at the rate of one every 27.5 milliseconds limited only by the rate the present telephone link transmits data.

Also, the means for establishing the initial values of the output voltages is accomplished using reed relays to short out the integrator capacitors upon command from the computer, resetting the output voltages to zero. This approach affords a considerable cost advantage over previous methods.

It is, therefore, a primary object of this invention to provide a low-cost line generator for remote display systems that operate from a Dataphone connection to a time-sharing computer.

It is a further object of this invention to provide low-cost means for resetting the integrator voltage output.

It is a further feature of this invention that the use of a storage CRT eliminates the need for high-speed data memory and associated high-speed picture generation hardware.

It is a further feature of this invention that intensity is invariant with line length.

It is a further feature of this invention that means is provided for commanding erasure of the storage CRT screen.

It is a further feature of this invention that the size of the current pulses fed into the integrators can be changed permitting line length to be scaled and enabling the drawing of characters of different sizes.

BRIEF DESCRIPTION OF THE DRAWING

The invention is illustrated with reference to the following drawings in which.

DESCRIPTION OF THE PREFERRED EMBODIMENT

Figure 1:
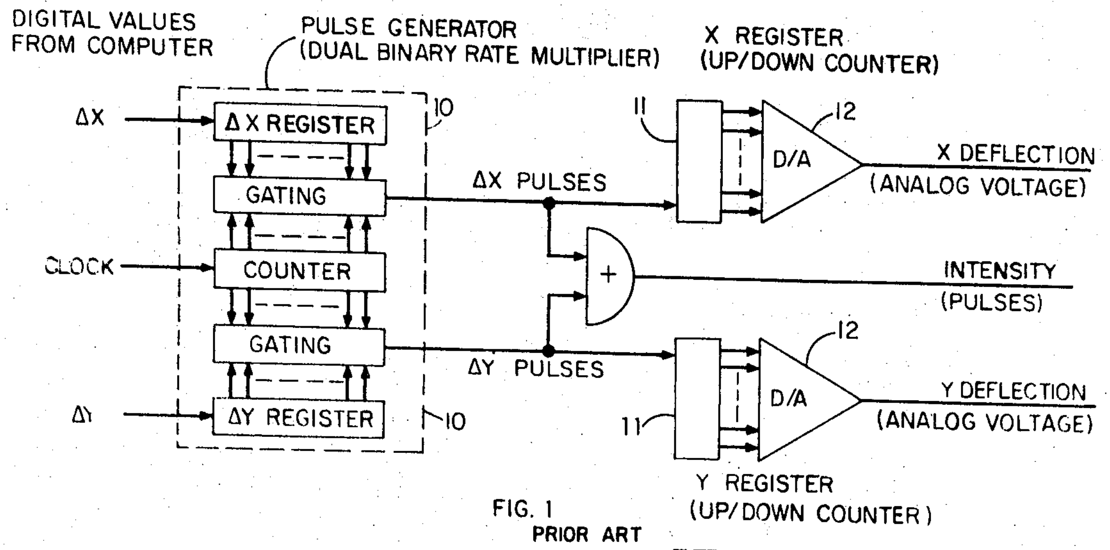
FIG. 1 PRIOR ART
FIG. 1 is a block diagram of a typical digital vector generator.
Figure 2:
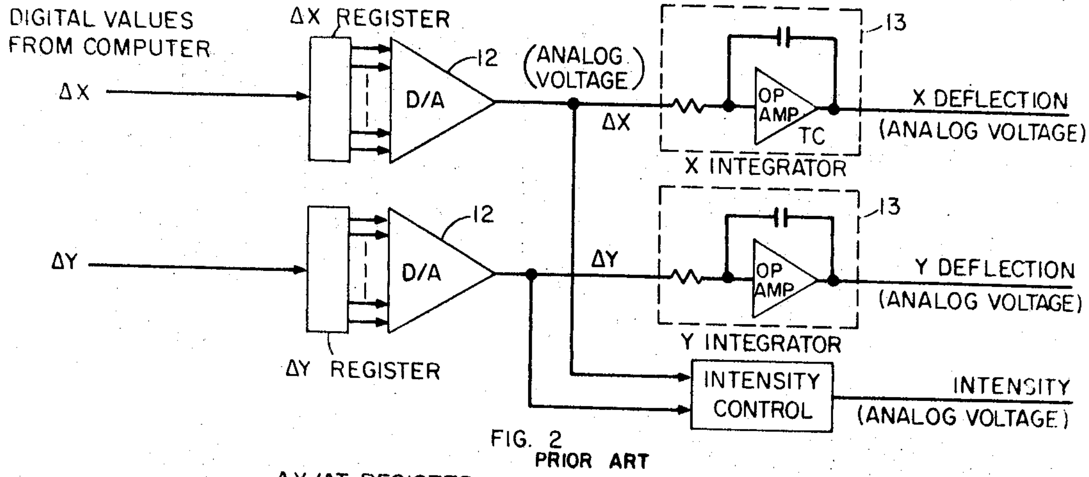
FIG. 2 PRIOR ART
FIG. 2 is a block diagram of a typical constant-time analog vector generator.
Figure 3:
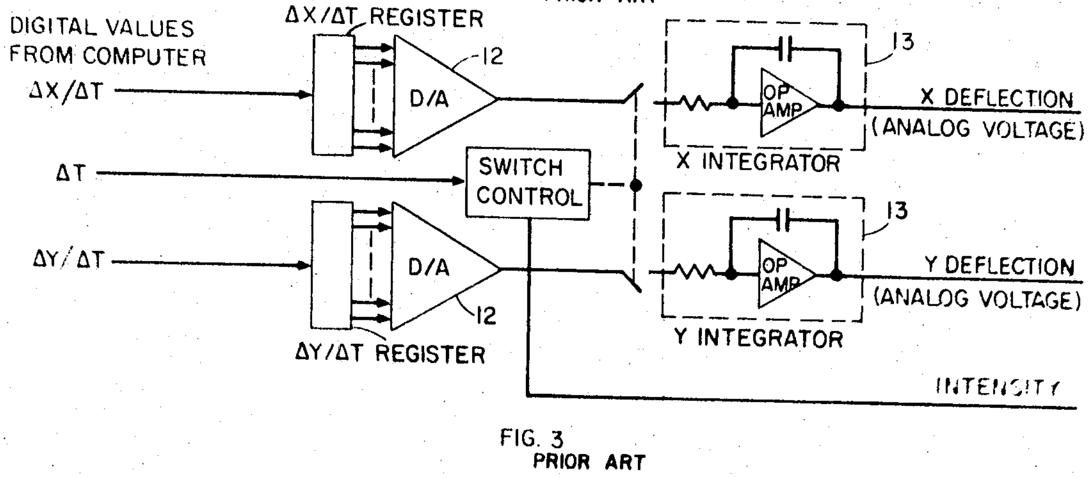
FIG. 3 PRIOR ART
FIG. 3 is a block diagram of a typical constant-speed analog vector generator.
Figure 4:
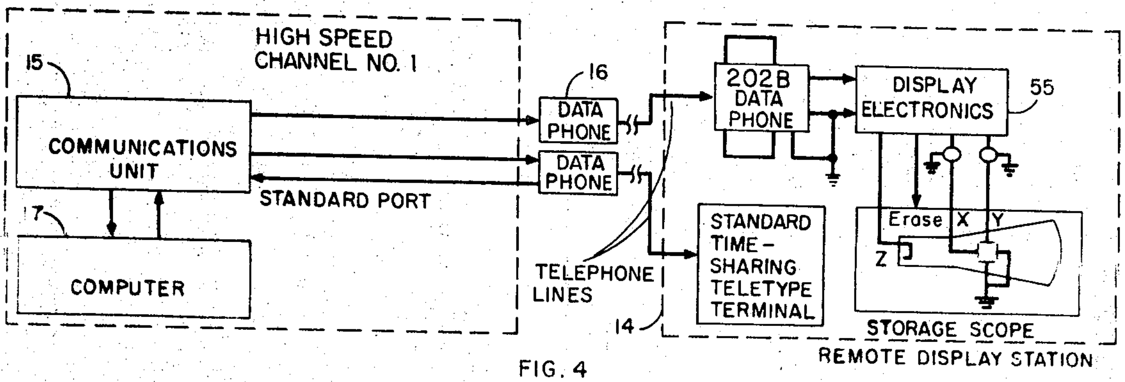
FIG. 4 is a block diagram of the preferred manner of transmitting data to the vector generator for display on the storage CRT.
Figure 5:
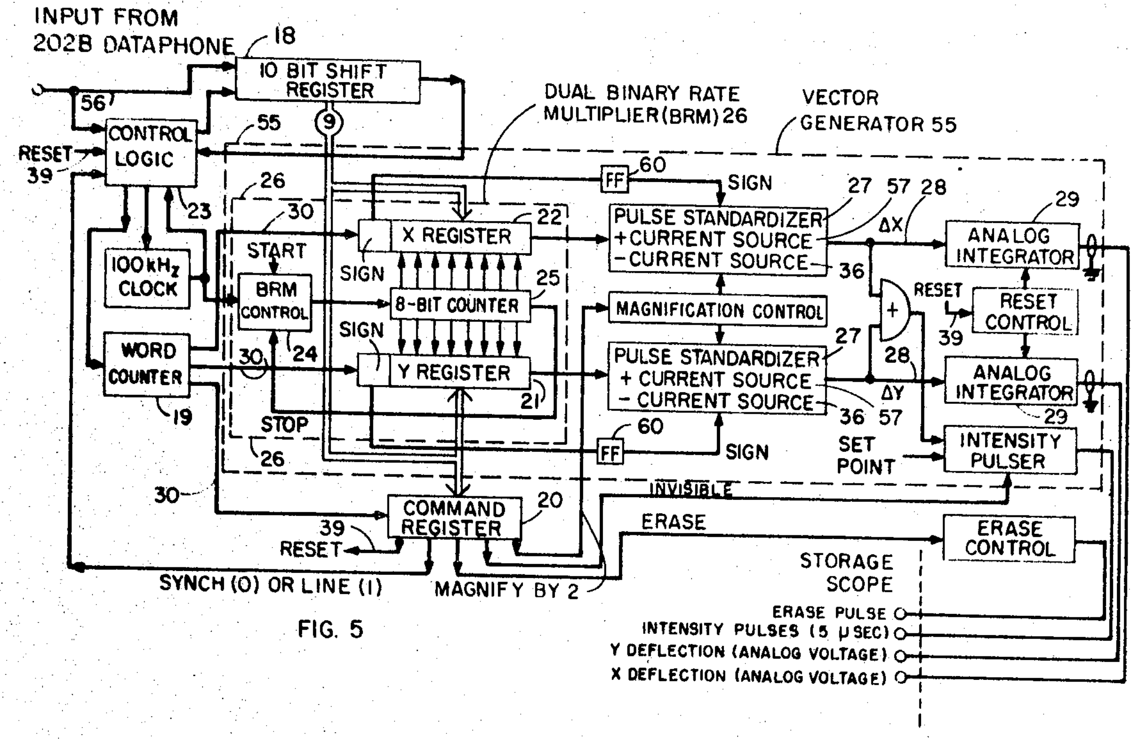
FIG. 5 is a block diagram of the vector generator and associated electronics.

With reference to FIGS. 4 and 5, a remote storage-tube display system 14 is connected to a high-speed IBM 7750 interface computer 15. The serial information from the interface computer 15 is transmitted via Dataphone 15 link to the remote storage-tube display system 14. The information to be displayed is generated and controlled by an IBM 7094 computer 17. The binary data is transmitted in 11 bit words in a continuous bit stream from the interface computer 15. Three words are required by the vector generator 55 to draw a line. In time sequence, these consist of a control word, a Y vertical data word, and a X horizontal data word. As each word is loaded 56 into the shift register 18, it is gated 30, by the word counter 19 into the command register 20, Y register 21, and X register 22 in that order. The control word, which is loaded 30 into the command register 20, provides commands to the control logic 23 which determines the starting point of the line to be drawn, and establishes the proper timing to start the BRM control 24.

Figure 6:
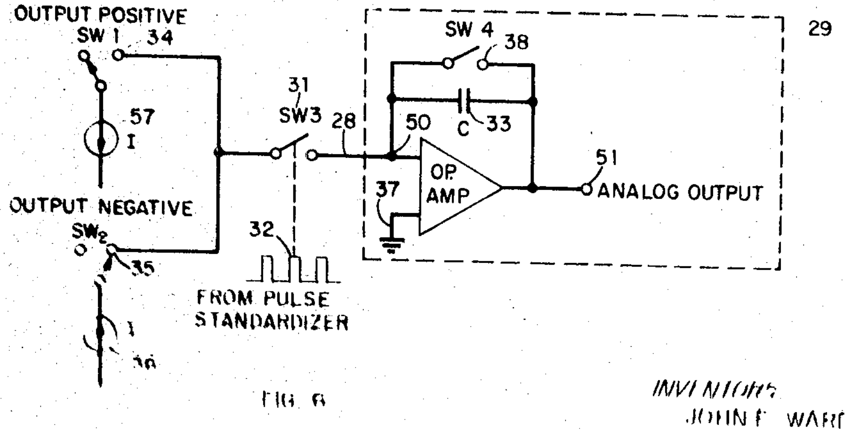
FIG. 6 shows the current sources, gating, and analog integrator for integrating a train of digital pulses.

The BRM control 24 allows the 8-bit counter 25 to count after the Y register 21 and X register 22 have been sequentially filled. Each half of BRM 26 is controlled by the binary data word loaded into its associated register. The output of each BRM 26 is a pulse train containing as many pulses as the binary count in its associated register. The function of the BRM 26 is disclosed in U.S. Pat. No. 3,069,608, Numerical Control Servo System. Each pulse train is fed to a pulse standardizer 27 comprised of a clock and two flip-flops that standardize the pulse train, putting out precise pulses of constant width. Each constant-width pulse 32 is used to gate a unit of current 28 from a current source 36 into an analog integrator 29 as shown in FIG. 6.

As the operation is identical for the output trains of both the X register and Y register, only the output pulse train of the Y register will be henceforth described. The cooperation of pulse standardizer 27, current sources 57 and 36, switches 31, 34, and 35, and bistable circuit 60 acts as a pulse current generator.

The state of bilateral semiconductor switch 31 field effect transistor is controlled by the output 32 of the pulse standardizer 27. Each time the switch 31 is closed, a pulse of current flows into the integrating capacitor 33, driving the analog output in a direction determined by the settings of semiconductor switch 34 and semiconductor switch 35. With semiconductor switch 35 closed and semiconductor switch 34 open, as shown in FIG. 6, current flows from the current source 36 through switch 31, across integrating capacitor 33 to ground 37, providing an output voltage change in a negative direction. With switch 34 closed and switch 35 open, current flow is in the opposite direction, resulting in a positive-going integrator output. The function of switch 38 is to short out the integrating capacitor 33 when it is desired to return the analog output to zero voltage. This is accomplished by the reset command 39 from the command register 20.

Figure 7:
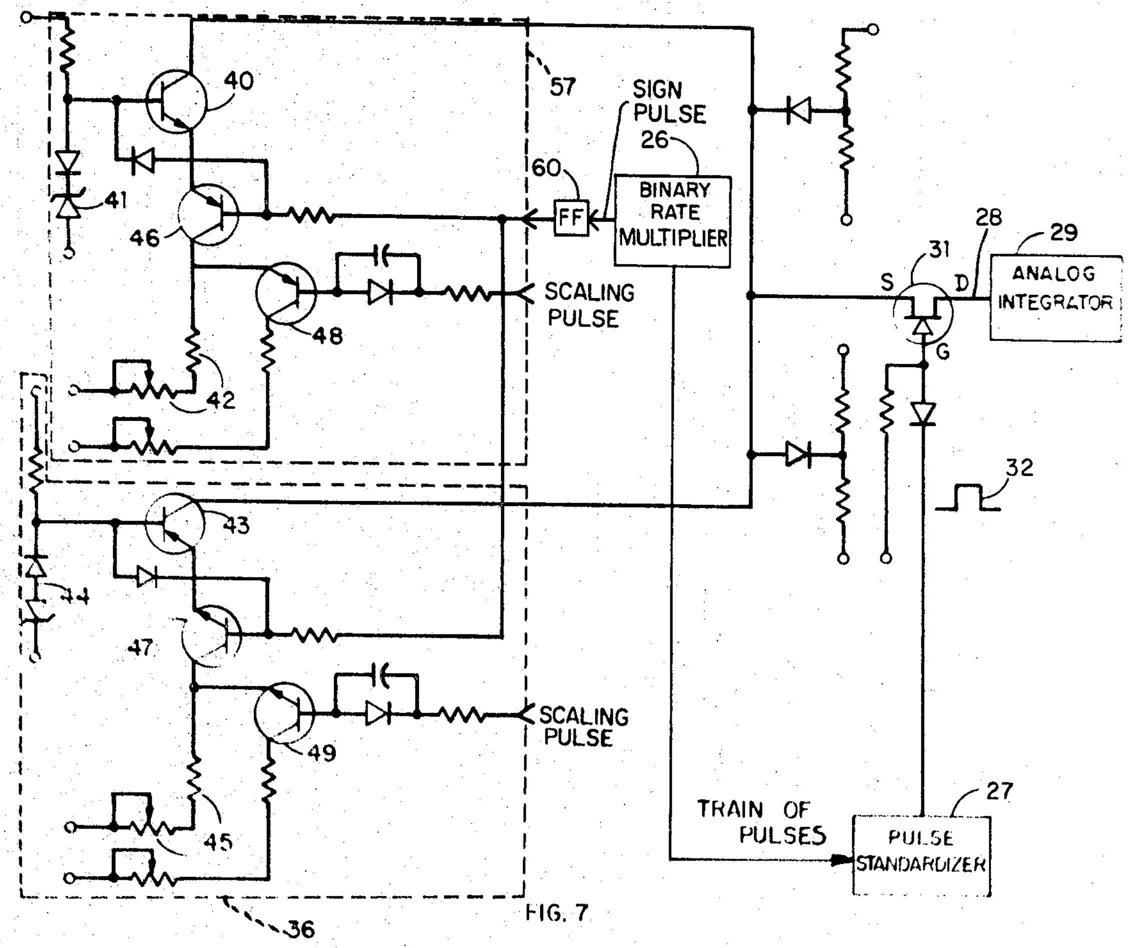
FIG. 7 shows the elements comprising the current sources and their associated semiconductor switches.

The current sources and its associated transistor switches are shown in FIG. 7. The positive current source 57 comprises transistor 40, Zener diode 41, and the resistance 42 in the emitter of transistor 40. The negative current source 36 comprises the complementary circuit, transistor 43, Zener diode 44, and resistance 45 in the emitter of transistor 43. Transistor 46 and transistor 47 servo as on-off switches, shown respectively at 34 and 35 in FIG. 6, for their respective current sources, controlled by a bistable circuit 60 that provides a minus 3 volt signal to switch transistor 46 on and transistor 47 off allowing current to flow toward the current source for the case of positive sign, and a zero volt signal to switch transistor 47 on and transistor 46 off allowing current to flow away from the current source for the case of negative sign. Switches 48 and 49 allow the integrator output to be scaled by a factor of two by doubling the current determining resistance in the emitters of transistor 40 and transistor 43 when transistor 46 and transistor 47 are saturated.

With reference to FIG. 6, each constant-width pulse 32 from the output of the standardizer 27 closes switch 31 for its duration, and allows current 28 to flow at the summing node 50 of the integrator 29. The output voltage 51 of the integrator changes as each incoming pulse 28 is integrated. The integrator output is the Y deflection voltage for the storage CRT. A second identical integrator provides the X deflection voltage for the storage CRT. Therefore, the relative magnitudes of the X and Y data words determine line length.

Figure 8:
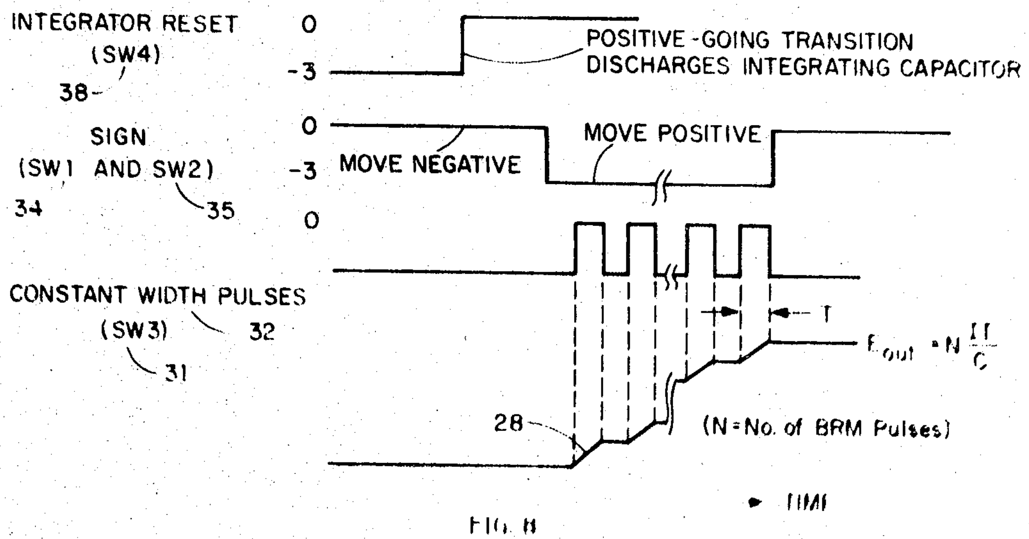
FIG. 8 shows the waveforms which illustrate the operation of an analog integration of a train of standardized digital pulses for the case of positive sign.

An examination of the waveforms of FIG. 8 illustrates the operation of an analog integration of a train of standardized digital pulses for the case of positive sign.

While the principles of the invention are described in connection with specific apparatus, it is to be clearly understood that this description is made only by way of example and not as a limitation to the scope of the invention as set forth in the objects thereof and in the accompanying claims.

What is claimed is:

1. I a vector generator of the type having an X and Y channel wherein a sign signal, and a train of pulses containing as many pulses as the binary count in the associated X and Y channel registers, are generated from a first pulse generator to provide for each channel a digital pulse train that represents the X and Y components of a length of a straight line, and wherein means for converting the train of pulses to a step-wise analog output voltage for each channel is provided to display means responsive to the analog output voltage so as to display the line, the improvement for converting the train of pulses to an analog output voltage comprises:

(a) an analog integrator; and (b) a second pulse current generator having its input connected to the first pulse generator and its output to the analog integrator, the second pulse generator being responsive to the pulse train to provide at its output a pulse of current for each pulse of the pulse train, each output current pulse being of the same width and amplitude, to produce at the output of the integrator a step change in output voltage, the second pulse generator being reesponsive to the sign signal to cause a change in polarity of the output current pulse dependent on the polarity of the sign signal whereby the incremented change in the output voltage of the analog integrator is in a direction determined by the sign signal.

2. Apparatus as recited in claim 1, where the second pulse current generator comprises:

(a) a positive source of current;

(b) a negative source of current;

(c) a first switch connected to control the fixed amplitude output of the positive source;

(d) a second switch connected to control the fixed amplitude output of the negative source;

(e) a bi-stable circuit having its input connected to the sign signal generator and its output connected to the first and second switches;

(f) the bi-stable circuit being responsive to the sign signals of said sign signal generator to electrically energize one of the first and second switches while de-energizing the other;

(g) a third switch having a first terminal connected to the outputs of the positive and negative current sources and a second terminal connected to the input of the analog integrator;

(h) constant-width pulse means having its input connected to the pulse train generator and its output connected to the gating terminal of the third switch; and (i) the third switch being responsive to the constant-width pulse to provide a low impedance between its first and second terminal for the duration of the constant-width pulse and a high impedance in the absence thereof, thereby, in the case of a negative sign signal, gating pulses of current from the negative current source to the analog integrator for the duration of the constant-width pulse resulting in an output voltage change in a negative direction, whereas in the case of a positive sign signal, pulses of current are gated from the analog integrator to the positive current source for the duration of the constant-width pulse resulting in an output voltage change in a positive direction.

3. Apparatus as recited in claim 2, wherein the third switch is a field-effect transistor in which the gate is connected to the output of the constant-width pulses, the source is connected to the output of the positive and negative current sources, and the drain is connected to the input of the analog integrator.

4. Apparatus as recited in claim 2, wherein the first pulse generator is a dual binary rate multiplier.

5. Apparatus as recited in claim 2, wherein the analog integrator is further provided with means for resetting the integrator output voltage to zero comprising:

(a) an integrating capacitor connected between the input and output of the analog integrator;

(b) a fourth switch connected in parallel with the capacitor;

(c) means for providing a command register pulse having its output connected to the fourth switch; and (d) the fourth switch being responsive to the command register pulse to discharge the capacitor thereby returning the analog output to zero voltage and to allow the capacitor to change in response to the constant-width pulse means in the absence of the command register pulse.

6. Apparatus as recited in claim 5, wherein the fourth switch is a read relay.

7. Apparatus as recited in claim 2, wherein means for changing the size of the current pulses fed to the analog integrator is provided thereby allowing line length to be scaled and enabling the drawing of characters of different sizes comprising:

(a) a fifth switch connected in parallel with the first switch;

(b) means for providing the first scaling pulse having its output connected to the fifth switch;

(c) the fifth switch being responsive to the first scaling pulse to provide a lower impedance for the duration of the first scaling pulse and a higher impedance in the absence thereof;

(d) a sixth switch connected in parallel with the second switch;

(e) means for providing a second scaling pulse having its output connected to the sixth switch; and (f) the sixth switch being responsive to the second scaling pulse to provide a lower impedance for the duration of the second scaling pulse and a higher impedance in the absence thereof.

References Cited

UNITED STATES PATENTS

| | | | |
|---|---|---|---|
| 3,213,376 | 10/1965 | Riordan et al. | 328—127 |
| 3,225,279 | 12/1965 | Muldoon et al. | 235—150.53 |
| 3,256,426 | 6/1966 | Roth et al. | 328—127 |
| 3,322,942 | 5/1967 | Gerard et al. | 235—150.51X |
| 3,329,947 | 7/1967 | Larrowe et al. | 340—347X |
| 3,350,651 | 10/1967 | Davis | 328—127X |
| 3,413,453 | 11/1968 | Thorpe | 235—150.51X |
| 3,447,148 | 5/1969 | Groth | 340—347 |

MAYNARD R. WILBUR, Primary Examiner

C. D. MILLER, Assistant Examiner

U.S. Cl. X.R.

235—197